United States Patent [19]

Lee

[11] Patent Number: 4,595,463

[45] Date of Patent: Jun. 17, 1986

[54] COBALT TREATMENT OF NICKEL COMPOSITE ELECTRODE SURFACES

[75] Inventor: Woodrow W. Lee, Silver Spring, Md.

[73] Assignee: The United States of America as represented by the Secretary of the Navy, Washington, D.C.

[21] Appl. No.: 740,114

[22] Filed: May 29, 1985

[51] Int. Cl.[4] .......................................... H01M 10/44
[52] U.S. Cl. .................................................... 204/2.1
[58] Field of Search .......................................... 204/2.1

[56] References Cited

U.S. PATENT DOCUMENTS

| | | | | |
|---|---|---|---|---|
| 3,507,699 | 4/1970 | Pell | ...................................... | 204/2.1 |
| 3,579,385 | 5/1971 | Feduska | ............................... | 204/2.1 |
| 3,852,112 | 12/1974 | Turner | ................................. | 204/2.1 |
| 4,215,190 | 7/1980 | Ferrando | ............................ | 429/222 |
| 4,292,143 | 9/1981 | Seiger | ................................... | 204/2.1 |

*Primary Examiner*—T. M. Tufariello
*Attorney, Agent, or Firm*—Kenneth E. Walden; Roger D. Johnson

[57] ABSTRACT

A process for introducing a cobalt additive into a nickel active material/sintered nickel-coated graphite fiber plaque composite electrode in which the electrode is (1) soaked in a solution of cobalt nitrate, cobalt sulfate, cobalt chloride, or cobalt acetate in water or a mixture of water and methanol, ethanol or n-propanol, and (2) a cathodic current having a density of from about 10 to about 200 mA/cm$^2$ is applied across the composite electrode for from 5 to 600 seconds.

12 Claims, 4 Drawing Figures

COBALT TREATMENT OF NICKEL COMPOSITE ELECTRODE SURFACES

BACKGROUND OF THE INVENTION

This invention relates to battery electrodes and more particularly to light weight sintered nickel battery electrodes.

The nickel composite electrode disclosed in U.S. Pat. No. 4,215,190 entitled "Lightweight Battery Electrode," which issued to William A. Ferrando and Raymond A. Sutula on July 20, 1980, has proven its advantage over conventional powder electrodes in reducing battery weight and bringing higher energy density without sacrificing durability and cycle-life. However, it suffers from one major drawback, i.e., a slow increase of active material utilization with cycling. Typically it takes 40-80 cycles to reach 90% utilization. This kind of slow formation has been identified as the single remaining barrier to the practical use of the composite electrode. Under similar impregnating conditions, powder-sinter electrode would not experience such a behavior. Conventionally sintered nickel electrodes are loaded with nickel hydroxide active material by chemical or electrochemical impregnation method. In either method about 5-7% (weight percentage) of cobalt hydroxide is added to the active material by coprecipitation from a same bath. Ferrando et al. (U.S. Pat. No. 4,215,190) used these conventional procedures to load their nickel phosphorous coated carbon fiber grid electrodes. William A. Ferrando in U.S. patent application Ser. No. 740,115, filed on May 29, 1985, entitled "Method of Impregnating Active Material into Composite Nickel Plaque," discloses a method which uses a suspension of fine particles of nickel active material (e.g., $Ni(OH)_2$) and a cobalt additive (e.g., $Co(OH)_2$) in ethylene glycol to impregnate the nickel-coated graphite fiber plaque. This method greatly reduces the cost of filling the plaque with nickel active material and cobalt compound; unfortunately, here as with the conventional methods from 40-80 cycles are required to reach the level of 90 percent utilization.

British Pat. No. 777,417 entitled "Improvements in or Relating to Process for Activating Positive Electrodes of Alkaline Accumulators," which issued to Hans Winkler on June 19, 1957, discloses a process in which a nickel hydroxide/nickel powder sintered electrode is soaked in a cobalt sulfate solution and then an alkali metal carbonate solution which causes cobalt hydroxide to precipitate out onto the nickel active material. Disappointingly, when this method is applied to nickel hydroxide/sintered nickel-coated graphite fiber electrodes, with their much longer pores, the treated electrodes still require from 25 to 30 charge-discharge cycles to obtain 90 percent of capacity.

Thus, it remains to find a method of reducing the number of charge-discharge cycles required to bring the cells up to 90 percent of capacity.

SUMMARY OF THE INVENTION

Accordingly, an object of this invention is to reduce the cost of manufacturing light weight, sintered nickel coated graphite fiber grid nickel electrodes.

Another object of this invention is to provide a more efficient method of introducing cobalt into the nickel active material of sintered nickel coated graphite fiber grid electrodes.

A further object is to provide a nickel electrode which uses less cobalt additive but more efficiently.

Still another object of this invention is to provide a method of reducing the number of charge-discharge cycles required to bring a cobalt additive/nickel active material/sintered nickel coated graphite fiber grid electrode up to 90 percent of capacity.

These and other objects of this invention are accomplished by providing a method of introducing a cobalt additive into a nickel active material/sintered nickel coated graphite fiber plaque composite electrode comprising:

(1) soaking the electrode in a cobalt solution of
 (a) from 0.01 to 3.5 M cobalt nitrate,
 (b) from 0.01 to 1.0 M cobalt sulfate,
 (c) from 0.01 to 1.0 M cobalt acetate, or
 (d) from 0.01 to 2.0 M cobalt chloride; and (2) applying a cathodic current having a density of from about 10 to about 200 $mA/cm^2$ to the composite nickel electrode for from 5 to 600 second. The resulting electrodes required only about 5 charge-discharge cycles to be brought up to 90 percent utilization of capacity.

BRIEF DESCRIPTION OF THE DRAWINGS

A more complete understanding of the invention and many of the attendant advantages thereto will be readily appreciated as the same becomes better understood by reference to the following detail description when considered in connection with the accompanying drawings wherein.

DETAILED DESCRIPTION OF THE PREFERRED EMBODIMENT

Figure 1:
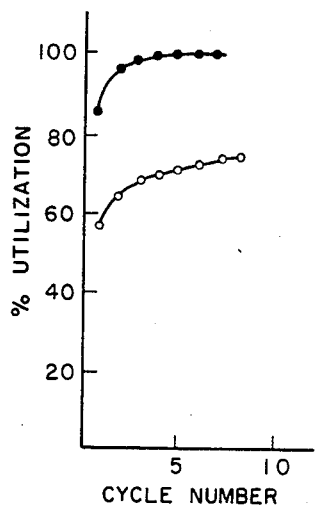
FIGS. 1 through 4 present experimental data and are discussed in the examples.
Figure 2:
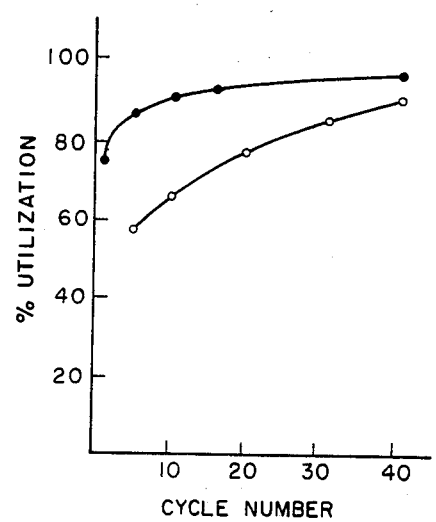
Figure 3:
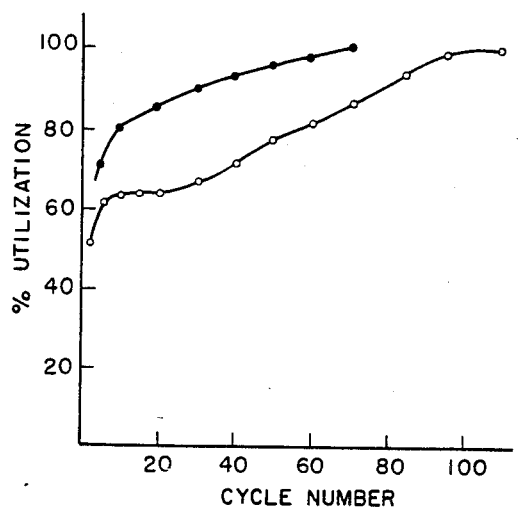

The process of this invention more efficiently adds cobalt additives to the nickel active material in the pores of a sintered plaque of nickel-coated graphite fibers. As a result of this procedure, the number of charge-discharge cycles required to bring a cell using the electrode to 90 percent of capacity has been greatly reduced.

U.S. Pat. No. 4,215,190 entitled "Light Weight Battery Electrode," issued to William A. Ferrando and Raymond A. Sutula on July 29, 1980, herein incorporated by reference, discloses examples of the sintered plaques or mats used in the electrodes and methods of preparing them. The graphite fiber used have a density of at least 1.8 $g/cm^3$, lengths of from 1 to 3 inches, and diameters of less than 10 microns. The nickel coating is actually a coating of from 85 to less than 100 weight percent of nickel with remainder being phosphorous. However, the coating functions electrochemically as pure nickel coating would. These plaques typically have a highly interconnected pore structure of average effective diameter 50-60 microns ($10^{-6}$ meter). Percent void volumes of 80-90 percent are easily achievable in those plaques.

Nickel active material may be added to the sintered nickel-coated graphite fiber plaques by conventional methods such as chemical or electrochemical deposition on the fibers. See for example U.S. Pat. No. 4,215,190, Ferrando et al. supra. A preferred procedure is disclosed in U.S. patent application Ser. No. 740,115, filed on May 29, 1985, entitled "Method of Impregnating Active Material into a Composite Nickel Plaque," by William Ferrando, filed as a U.S. patent application simultaneously with the present application and herein incorporated by reference. In this method Ferrando et al. suspends fine (20 microns or less in diameter) particles of nickel active material in ethylene glycol and gently rubs the suspension into the plaque, allowing gravity to do much of the work. The ethylene glycol is then removed by evaporation. The nickel active material may be nickel hydroxide nickel oxide, or mixtures thereof, with nickel hydroxide being preferred.

The critical feature of the process of this invention is the method by which the cobalt is added to the nickel active material in the sintered nickel coated graphite fiber plaque. First, the nickel active material in the plaque is soaked in a aqueous solution of a cobalt salt chosen from:
(a) from 0.01 to 3.5M cobalt nitrate,
(b) from 0.01 to 1.0M cobalt acetate,
(c) from 0.01 to 1.0M cobalt sulfate, and
(d) from 0.01 to 2.0M cobalt chloride.
Preferably, a solution of
(a) from 0.1 to 2.0M cobalt nitrate,
(b) from 0.1 to 0.5M cobalt acetate,
(c) from 0.1 to 1.0M cobalt sulfate, or
(d) from 0.1 to 1.0M cobalt chloride is used.

The solvent used for the aqueous solutions is preferably pure water, but solutions of low molecular weight alcohol (e.g., methanol, ethanol, 1-propanol) and water in up to a 1:1 volume ratio of alcohol to water may be used. Ethanol is the preferred alcohol. The upper limit of salt concentration is determined by practible factors such as the solubility of the salt or the viscosity of the resulting solution.

After the cobalt solution has completely soaked in to the plaque and covered the surface of the nickel active material particles, a cathodic current having a density of from about 10 to about 200 mA/cm$^2$, and preferably from 20 to 100 mA/cm$^2$ is applied to the plaque/active material for from about 5 to about 600 seconds, and more preferably from 5 to 300 seconds. The cobalt solution is preferably kept at from 50° to 80° C. during this electrochemical step. The electrical current converts the water soluble cobalt salts to water insoluble cobalt or cobalt hydroxide which forms a uniform coating on the surface of nickel hydroxide active material. When an operation cell that is made of the nickel electrode and commercial Cd electrodes with 31% KOH as the electrolyte is put into cycling, only about 3 to 5 charge-discharge cycles (C charge rate for 1 hour, C/2 discharge rate until the cell potential reduces to 1.0 v) are required to bring the nickel electrode to 90 percent of capacity.

Two more preferred methods of surface treating the nickel active material are:
(1) using a solution of from 1.0 to 1.8M cobalt nitrate in a solvent mixture of from 30 to 50 volume percent of ethanol with the remainder being water and applying a cathodic current with a density of from 50 to 80 mA/cm$^2$ across the nickel composite electrode for from 5 to 20 seconds; or
(2) using a solution of from 0.2 to 0.5M cobalt acetate in water and applying a cathodic current with a density of from 30 to 80 mA/cm$^2$ across the nickel composite electrode for from 20 to 120 seconds.

However, after the cobalt additive deposition step and before the plaque is placed into its operational cell, it is preferably placed in a 31% KOH solution with a nickel sheet counter electrode and subjected to a formation cycle. The formation cycle generally comprises applying 5 minutes of anodic current at C rate and then 5 minutes of cathodic current at C rate to the plaque. (C rate is the amount of current required to charge the cell to capacity in one hour.) This step is used to remove anions remaining after the cobalt deposition step. For example, the procedure lets the trapped $NO_3^-$ ions be dissolved in the alkaline electrolyte.

The general nature of the invention having been set forth, the following examples are presented as specific illustrations thereof. It will be understood that the invention is not limited to these examples but is susceptible to various modifications that will be recognized by one of ordinary skill in the art.

For Examples 1, 3, and 4, a conventional electrochemical method was used to impregnate nickel hydroxide into the sintered nickel coated graphite fiber composite plaque. A 3"×3" plaque of the thickness specified in each example served as the cathode and was placed between two nickel sheet anodes. The current density during the process was kept above 80 m A/cm$^2$. Commercial nickel nitrate containing 2 percent cobalt was used. The electrolyte used for the coprecipitation control samples was 1.8M in nickel nitrate and 0.2M in cobalt nitrate in 1:1 by volume ethanol/water. The electrolyte used to prepare the samples to be surface treated according to the processes of this invention were 1.8M in nickel nitrate (alone) in 1:1 by volume ethanol/water. The temperature of the solutions were kept between 70° C. and 85° C. Two hours of impregnation normally brings over 160 Ah/kg capacity on 30 mils composite plaque.

In Example 2, the suspension method of Ferrando U.S. patent application Ser. No. 740,115, filed on May 29, 1985 was used and is described in that example.

In both methods care was taken that no thick surface deposit of active material was formed which would possibly block further penetration of electrolytes.

The charge-discharge cycling test results for Examples 1–4 are presented in corresponding FIGS. 1–4. Each charge-discharge cycle consisted of charging at C rate for one hour and then discharging at C/2 rate to a 1.0 v cut-off. (C rate is the current which will charge the cell to capacity in one hour and C/2 rate is one-half of that current.)

The electrochemical and surface treatment steps, where $Ni(NO_3)_2$ or $Co(NO_3)_2$ are used, leave $NO_3^-$ anions as a contaminant in the plaques. Therefore, prior to the charge-discharge cycling, the plaques were subjected to a formation cycle which removed the trapped $NO_3^-$ as the dissolved ions. Each plaque was placed in a 31 percent KOH solution with a nickel sheet counter electrode. The formation cycle comprised applying 5 minutes of anodic current at C rate and then 5 minutes of cathodic current at C rate to the plaque.

EXAMPLE 1

A control electrode (No. 60) was prepared by the electrochemical method using a sintered nickel-coated graphic fiber composite plaque 30 mils thick with 85 percent porosity and an electrolyte of 1.8M $Ni(NO_3)_2$ and 0.2M $Co(NO_3)_2$ in 1:1 by volume ethanol/water. A loading level of 161 Ah/kg was achieved in this coprecipitation procedure.

A test electrode (No. 59) was prepared by the electrochemical method using a sintered nickel-coated graphite fiber composite plaque 30 mils thick with 85 percent porosity and an electrolyte containing only 1.8M $Ni(NO_2)_2$ in 1:1 by volume ethanol/water. A loading level of 161 Ah/kg was achieved. Next the electrode was surface treated in an electrolyte of 1.8M $Co(NO_3)_2$ in 1:1 by volume ethanol/water by applying a cathodic current of 50 mA/cm$^2$ across the nickel composite electrode (working electrode) for 30 seconds. A pure nickel electrode was used as the counter electrode.

The control (No. 60) electrode and the test (No. 59) electrode were each subjected to a formation cycle. Then each electrode was subjected to a regimen of cycling consisting of charging at C rate for one hour and then discharging at C/2 rate to a 1.0 v cut-off. The results are presented in FIG. 1 where the solid circles represents the results for the surface treated test electrode (No. 59) and the open circles represent the results for the coprecipitated control electrode (No. 60). The surface treated electrode reaches 90 percent utilization of capacity at a much faster rate than the conventional coprecipitated electrode.

EXAMPLE 2

The suspension impregnation method of William Ferrando U.S. patent application Ser. No. 740,115, filed on May 29, 1985, supra, was used to prepare both the control electrode (electrode A) and the surface-treated test electrode (electrode 63). For the control electrode A, a mixture of fine particles (20 microns) of 93 percent by weight of commercial nickel hydroxide (containing 2 percent cobalt) and 7 percent by weight of cobalt hydroxide was suspended in ethylene glycol. The suspension was gently rubbed and sucked into a 30 mil thick, 85 percent porosity sintered nickel-coated graphite fiber composite plaque. The ethylene glycol was then removed by evaporation. A loading level of 160 Ah/kg capacity was achieved.

The test electrode (No. 63) was prepared using the same plaque and the same suspension method except that 100 percent commercial nickel hydroxide was loaded into the plaque. The plaque was then surface treated according to the method used in Example 1 except that the cathodic current was applied to the composite plaque for 1 minute.

The control electrode (A) and the surface-treated test electrode (No. 63) were subjected to the same charge-discharge (C rate charge for 1 hour; C/2 rate discharge to a 1.0 v cut-off) cycling as was used in Example 1. The results are presentation in FIG. 2 where the solid circles represent the results for the surface-treated test electrode (No. 63) and the open circles represent the results for the co-impregnated control electrode (A). The surface electrode reaches an 85–90 percent utilization of capacity at a much faster rate than the control electrode.

EXAMPLE 3

The methods used in example 1 were used on sintered nickel-coated graphite fiber plaques which were 100 mil thick and had a porosity of 80 percent. The coprecipitated control electrode (electrode No. 27) was loaded to a capacity of 180 Ah/kg. The surface treated test electrode (electrode No. 77) was loaded to a capacity of 175 Ah/kg and then surface treated in cobalt nitrate as in example 1 except that the cathodic current was passed through the composite plaque for 20 seconds.

The coprecipitated control electrode (No. 27) and the surface-treated test electrode (No. 77) were subjected to the same formation cycle and then the same charge-discharge (C rate charge for 1 hour; C/2 rate discharge to a 1.0 v cut-off) cycling as was used in example 1. The results are presented in FIG. 3 where the solid circles represent the results for the surface-treated test electrode (No. 77) and the open circles represent the results for the coprecipitated control electrode No. 27). Again, the surface treated electrode reaches a high, stable rate of utilization in fewer cycles that the conventional coprecipitated electrode.

EXAMPLE 4

A surface treated test electrode (No. 66) was prepared according to the procedure used in Example 1 (for electrode 59). The cathodic current was applied to electrode No. 66 for 20 seconds during the surface treatment. The electrode 66 had a capacity of 159 Ah/kg.

Another surface treated electrode (electrode No. 67) loaded to 146 Ah/kg was prepared according to the method of example 1 but with the following modifications to the surface treatment. (1) an electrolyte of 0.5M cobalt acetate in water was used, and (2) the cathodic current was applied to the composite plaque for 2 minutes.

Figure 4:
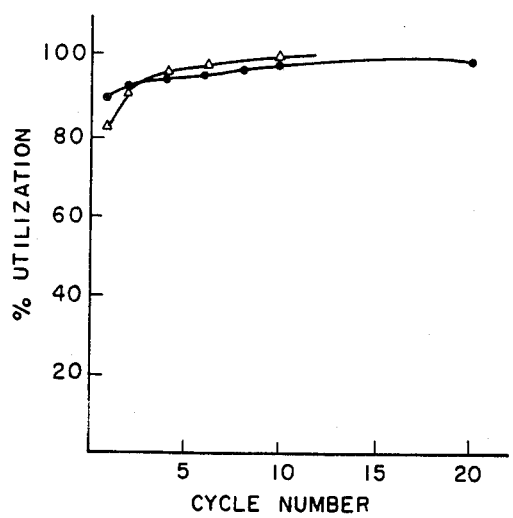

The cobalt nitrate surface treated test electrode (No. 66) and the cobalt acetate surface treated test electrode (No. 67) were subjected to the same formation cycle and then the same charge-discharge (C rate charge for 1 hour; C/2 rate discharge to a 1.0 v cut-off) cycling as was used in Example 1. The results are shown in FIG. 4 where solid circles represent the results for the cobalt nitrate surface treated test electrode (No. 66) and solid triangles represent the results for the cobalt acetate surface treated test electrode (No. 67). As can be seen, 90 percent utilization is achieved in about 3 to 5 cycles for both the cobalt nitrate and cobalt acetate surface treated electrodes. This demonstrates that the anion of the cobalt salt is not critical to the surface treatment process. Therefore, other water soluble cobalt salts such as cobalt sulfate ($CoSO_4$) and cobalt chloride ($CoCl_2$) should work equally well.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A process of treating a nickel active material/sintered nickel coated graphite fiber grid composite electrode comprising:
(1) soaking a nickel composite electrode comprising
   (a) a grid of sintered nickel-coated graphite fibers wherein the grid has pores of an average effective diameter of from 50 to 60 microns, and
   (b) an nickel active material selected from the group consisting of nickel oxide, nickel hydroxide, and mixtures thereof which is contained in the pores of the grid in a cobalt solution select from the group consisting of
      (a) from 0.01 to 3.5M cobalt nitrate,
      (b) from 0.01 to 1.0M cobalt sulfate
      (c) from 0.01 to 1.0M cobalt chloride, and
      (d) from 0.01 to 2.0M cobalt acetate in a solvent selected from the group consisting of (i) water and (ii) a mixture of water and from more than zero to 50 volume percent of an alcohol selected from the group consisting of methanol, ethanol, n-propanol, and mixtures thereof; and (2) applying a cathodic current having a density of from about 10 to about 200 mA/cm$^2$ across the nickel composite electrode for from 5 to 600 seconds while the electrode is in the cobalt solution.

2. A process according to claim 1 wherein the solvent is water.

3. A process according to claim 1 wherein the solvent is a mixture of water and an alcohol selected from the group consisting of methanol, ethanol, n-propanol, and mixtures thereof, wherein the alcohol comprises from more than zero to 50 volume percent of the solvent with water being the remainder.

4. A process according to claim 3 wherein the alcohol is ethanol.

5. A process according to claim 3 wherein the alcohol comprises from 30 to 50 volume percent of the solvent with water being the remainder.

6. A process according to claim 1 wherein step (2) is performed at a temperature of from about 50° C. to about 80° C.

7. A process according to claim 1 wherein the cobalt solution is selected from the group consisting of
 (a) from 0.1 to 2.0M cobalt nitrate,
 (b) from 0.1 to 0.5M Cobalt sulfate,
 (c) from 0.1 to 1.0M cobalt chloride, and
 (d) from 0.1 to 1.0M cobalt acetate in the solvent of claim 1.

8. A process according to claim 1 wherein in step (2) a cathodic current having a density of from 20 to 200 mA/cm$^2$ is applied across the nickel composite electrode for from 5 to 300 seconds while the electrode is in the cobalt solution.

9. A process according to claim 1 wherein the cobalt solution comprises from 1.0 to 1.8M cobalt nitrate in the solvent of claim 1 and the cathodic current applied across the nickel composite electrode in step (2) has a density of from 50 to 80 mA/cm$^2$ and is applied for from 5 to 20 seconds.

10. A process according to claim 9 wherein the solvent used is a mixture of from 30 to 50 volume percent of ethanol with the remainder being water.

11. A process according to claim 1 wherein the cobalt solution comprises from 0.2 to 0.5M cobalt acetate in the solvent of claim 1 and the cathodic current applied across the nickel composite electrode in step (2) has a density of from 30 to 80 mA/cm$^2$ and is applied for from 20 to 120 seconds.

12. A process according to claim 11 wherein the solvent is water.

* * * * *